US006586112B1

(12) United States Patent
Te

(10) Patent No.: US 6,586,112 B1
(45) Date of Patent: Jul. 1, 2003

(54) MANDREL AND ORIFICE PLATES ELECTROFORMED USING THE SAME

(75) Inventor: Bun Chay Te, Singapore (SG)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/629,402

(22) Filed: Aug. 1, 2000

(51) Int. Cl.[7] .............................. B01J 2/14; B01J 2/16; C25D 1/08

(52) U.S. Cl. ......................... 428/596; 428/600; 347/20; 347/40; 205/75

(58) Field of Search ................................ 428/596, 600; 205/75; 347/20, 40

(56) References Cited

U.S. PATENT DOCUMENTS

| | | | | | |
|---|---|---|---|---|---|
| 4,107,699 | A | * | 8/1978 | Kenworthy | 347/47 |
| 4,229,265 | A | * | 10/1980 | Kenworthy | 205/50 |
| 4,374,707 | A | * | 2/1983 | Pollack | 205/75 |
| 4,430,784 | A | | 2/1984 | Brooks et al. | |
| 4,678,680 | A | * | 7/1987 | Abowitz | 205/69 |
| 4,773,971 | A | | 9/1988 | Lam et al. | 204/11 |
| 4,827,287 | A | * | 5/1989 | Braun et al. | 205/134 |
| 4,839,001 | A | * | 6/1989 | Bakewell | 205/50 |
| 4,844,778 | A | * | 7/1989 | Witte | 205/75 |
| 4,971,665 | A | * | 11/1990 | Sexton | 205/75 |
| 4,972,204 | A | * | 11/1990 | Sexton | 205/122 |
| 5,149,419 | A | * | 9/1992 | Sexton et al. | 205/67 |
| 5,560,837 | A | * | 10/1996 | Trueba | 205/127 |
| 6,315,385 | B1 | * | 11/2001 | Te | 347/20 |

FOREIGN PATENT DOCUMENTS

| | | |
|---|---|---|
| EP | 0272764 | 6/1988 |
| WO | WO90/04519 | 5/1990 |
| WO | WO97/40213 | 10/1997 |
| WO | WO99/15337 | 4/1999 |
| WO | WO99/20813 | 4/1999 |

OTHER PUBLICATIONS

Vol. 2002, No. 05, May 3, 2002 & JP 2002 001909 A (Murata Mfg Co Ltd), Jan 8, 2002.

Vol. 2002, No. 04, Aug. 4, 2002 & JP 2001 334671 (Ricoh Co Ltd), Dec. 4, 2001.

* cited by examiner

*Primary Examiner*—John J. Zimmerman

(57) ABSTRACT

A mandrel for electroforming non-uniformly thick orifice plates and a method of making the mandrel are disclosed. The orifice plates have a thicker border surrounding a thinner orifice area. The mandrel has a metallic layer on a substrate. The metallic layer has a first molding surface that is electrically isolated from a second molding surface. The first and second molding surfaces are for substantially electroforming the border and the orifice area respectively. The mandrel also has dielectric areas patterned on the metallic layer for electroforming orifices in the orifice area. In use, the first molding surface is used to first electroform the border without electroforming the orifice area. As the border builds up, it electrically connects the first and the second molding surfaces to allow the second molding surface to subsequently electroform the orifice area.

8 Claims, 5 Drawing Sheets

4
6

10
4
6

UV Light
11
12
4
6

14
16
10
4
6

20
18
19
4
6

8
6

UV Light
24
26
8
6
22

8
18
19
4
6

MANDREL AND ORIFICE PLATES ELECTROFORMED USING THE SAME

FIELD OF INVENTION

This invention relates to a mandrel, a method of making the mandrel and orifice plates electroformed using the mandrel. The orifice plate that is formed has a thin orifice area surrounded by a thicker border. The thinner orifice area allows more orifices to be packed into a given area while the thicker border allows the orifice plate to withstand the rigors of manufacturing.

BACKGROUND

A prior-art mandrel for electroforming orifice plates has a substrate of glass, plastic or a polished silicon wafer. A thin film layer of conductive material is deposited on this substrate. The conductive material is typically of chrome and stainless steel. A layer of dielectric is deposited on the conductive layer. This dielectric layer is of a nonconductive material such as silicon carbide. Patterns on the dielectric layer are lithographically formed using conventional masking, ultraviolet exposure and etching techniques to dimensionally define a molding surface for molding orifices in orifice plates. U.S. Pat. No. 4,773,971 discloses a method of making such a mandrel.

Orifice plates are formed on a mandrel in an electroforming process. The orifice plates thus formed are all on a single sheet. Breaking tabs that are also electroformed on the sheet defines the boundaries of each orifice plate. In the manufacturing of printheads, the sheet of orifice plates is attached to a mounting tape, for example, the Nitto Denko Elep Holder type V-8T available from Nitto Denko Corporation, Tokyo, Japan. The orifice plates are next singulated into individual orifice plates by breaking the sheet along the breaking tabs. The mounting tape holds the singulated orifice plates for further processing. A machine next picks and places each orifice plate over a corresponding printhead die on a wafer containing many such dies. The wafer and attached orifice plates are put through a "stake and bake" process to cause the orifice plates to adhere to the dies. After the "stake and bake" process, each printhead consisting of a die and an orifice plate is singulated using dice sawing. Each complete pair of orifice plate and printhead die is then ready for attaching to a pen body to complete the fabrication of an ink-jet pen. This pen body typically contains an ink reservoir which supplies ink to the printhead. In such a manufacturing process, the orifice plates are subjected to considerably rough handling during the steps of singulation and attachment to the printhead dies.

To withstand such rigors in the manufacturing process, the orifice plates will have to be of a certain minimum thickness. As the size of an orifice is directly proportional to the thickness of an orifice plate due to the electroforming process, the thicker the orifice plate, the larger will be the orifices. These larger orifices will mean that fewer orifices can be packed into a given area, thus limiting the orifice count and resolution of an orifice plate. It is therefore desirable to keep the orifice plate thin so as to allow more orifices to be packed into a given area, since the orifices will be relatively smaller. However, this desirability contradicts the requirement to keep the orifice plates sufficiently thick for reasons previously discussed.

Prior art mandrels can only form orifice plates that are substantially uniformly thick. There is therefore the need for a new mandrel and method for electroforming orifice plates of a non-uniform thickness.

SUMMARY

In one aspect of the present invention, a mandrel according to one embodiment has a metallic layer on a substrate. The metallic layer has a first molding surface that is electrically isolated from a second molding surface. The second molding surface is for substantially electroforming an orifice area of an orifice plate. The first molding surface is for substantially electroforming portions on the orifice plate that are thicker than the orifice area. These thicker portions are preferably portions that form a border around the orifice area. The mandrel also has means for electroforming orifices in the orifice area. In use, the first molding surface is predominantly allowed to electroform the thicker portions without the second molding surface electroforming the orifice area. As the thicker portions build up, they electrically connect the first and the second molding surfaces to allow the second molding surface to subsequently electroform the orifice area. The orifice plate thus formed is non-uniformly thick.

In another aspect of the present invention, a preferred method of making the above mandrel involves depositing a metallic layer on a substrate followed by depositing a first photoresist layer on the metallic layer. Next, a first photomask having a first pattern is positioned on the first photoresist layer. The first photomask and the first photoresist layer are exposed to ultraviolet light for a predetermined period. After the exposure, the first photoresist layer is developed to produce the first pattern on the metallic layer. The portions of the metallic layer exposed by the first pattern of the first photomask is then etched to define the first and second molding surfaces. The method also includes introducing means for electroforming orifices in the orifice area. The remaining photoresist layer is stripped from the etched metallic layer. Preferably, introducing means for electroforming orifices in the orifice area involves stripping the remaining first photoresist layer and depositing a dielectric layer on the etched metallic layer followed by depositing a second photoresist layer on the dielectric layer. A second photomask having a second pattern is positioned on the second photoresist layer. Similarly, the second photomask and the second photoresist layer are exposed to ultraviolet light. Again, after exposure, the second photoresist layer is developed to produce the second pattern on the dielectric layer. The portions of the dielectric layer that are exposed by the second pattern are etched to define the dielectric areas.

In yet another aspect, an orifice plate electroformed using the above mandrel has an orifice area and portions that are thicker than the orifice area. The orifice area has orifices electroformed on it. The thicker portions are preferably portions of the orifice plate that form a border surrounding the orifice area.

BRIEF DESCRIPTION OF DRAWINGS

The invention will be better understood with reference to the drawings, in which.

DETAILED DESCRIPTION OF THE PREFERRED EMBODIMENT

Figure 1A:
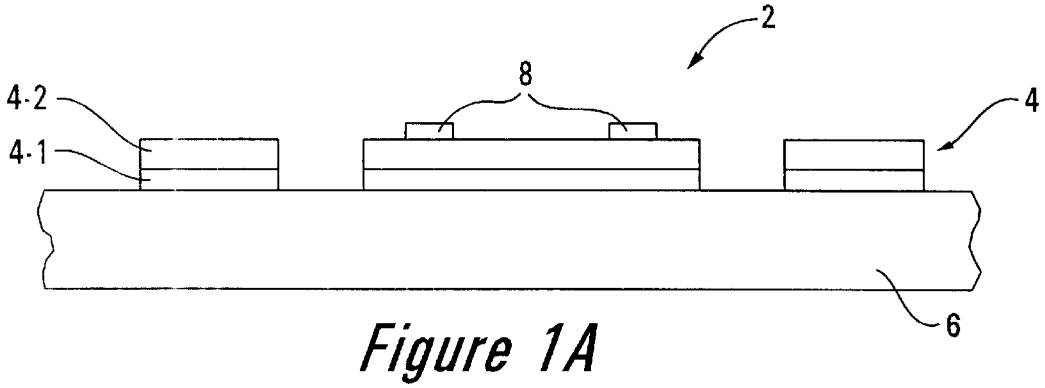
FIG. 1A is a cross-sectional view of a mandrel taken along a line X—X in FIG. 1B.
Figure 1B:
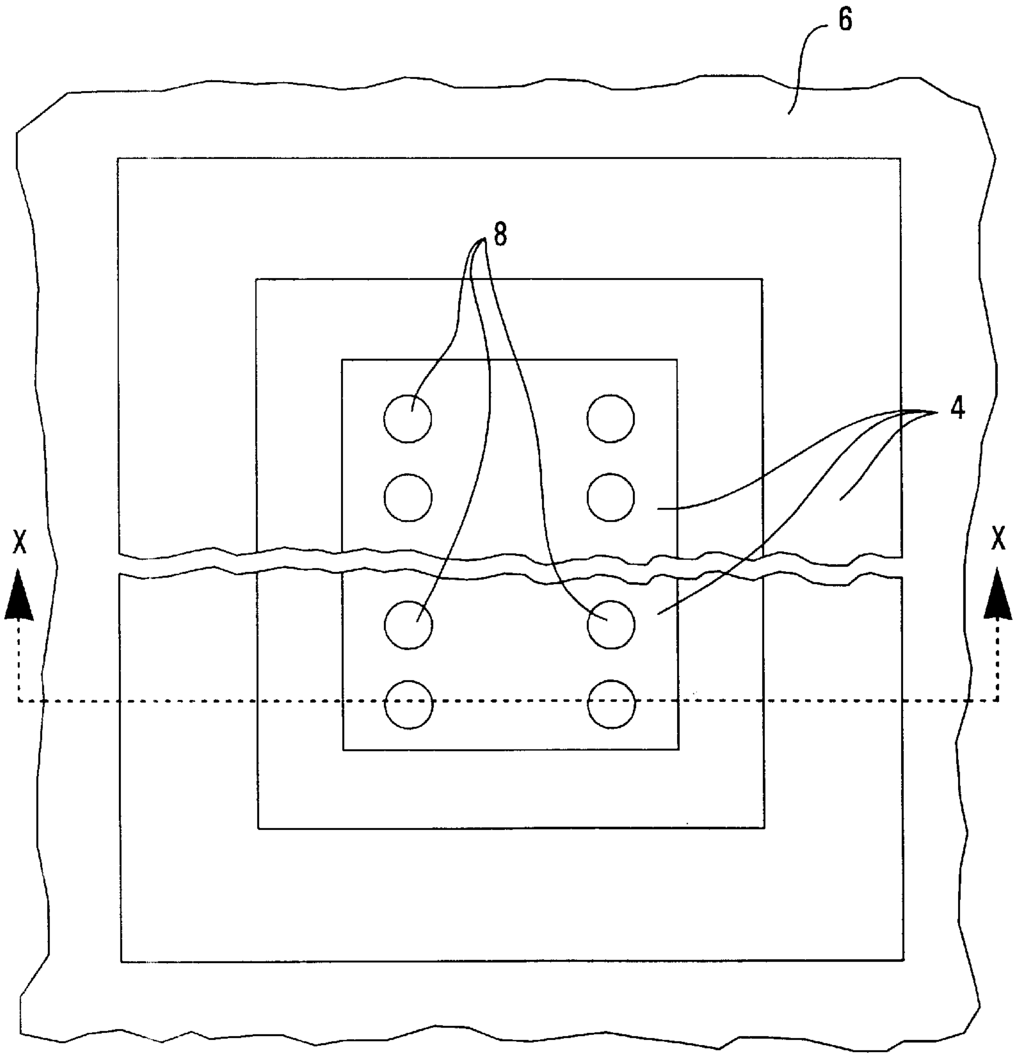
FIG. 1B is a plan view of the mandrel in FIG. 1 A.

FIGS. 1A and 1B show an illustrative reusable mandrel 2 for electroforming an orifice plate. This mandrel 2 is shown to be able to form only one orifice plate. It is well known to those skilled in the art that given the size of an orifice plate and the surface area of a substrate of the mandrel 2, many orifice plates can be formed simultaneously using a single mandrel. FIG. 1A is an enlarged cross-sectional view of the mandrel 2. The mandrel 2 has a conductive thin film 4 deposited on a substrate 6. Examples of substrates are a glass substrate, a plastic substrate or a polished silicon wafer. This conductive thin film 4 preferably ranges from 100 angstroms to 200 microns thick. Other thickness ranges are possible. This conductive thin film 4 is preferably made up of a layer of chrome 4-1 beneath a layer of stainless steel 4-2. The chrome layer 4-1 bonds firmly to the substrate 6 and provides a surface that the stainless steel layer 4-2 can adhere to. A dielectric layer 8 is deposited on top of the conductive thin film 4. This dielectric layer 8 is shown having been patterned and etched to form a molding surface for electroforming orifices in an orifice plate.

FIGS. 2A–2H show the different stages of a process for making the mandrel 2. This process is similar to that disclosed in U.S. Pat. No. 4,773,971. However, the image or pattern on a photomask used in the making of the mandrel changes the structure of the completed mandrel substantially to render it significantly advantageous over the prior art mandrel disclosed in the patent.

Figures 2A, 2B, 2C, 2D, 2E, 2F, 2G, 2H:
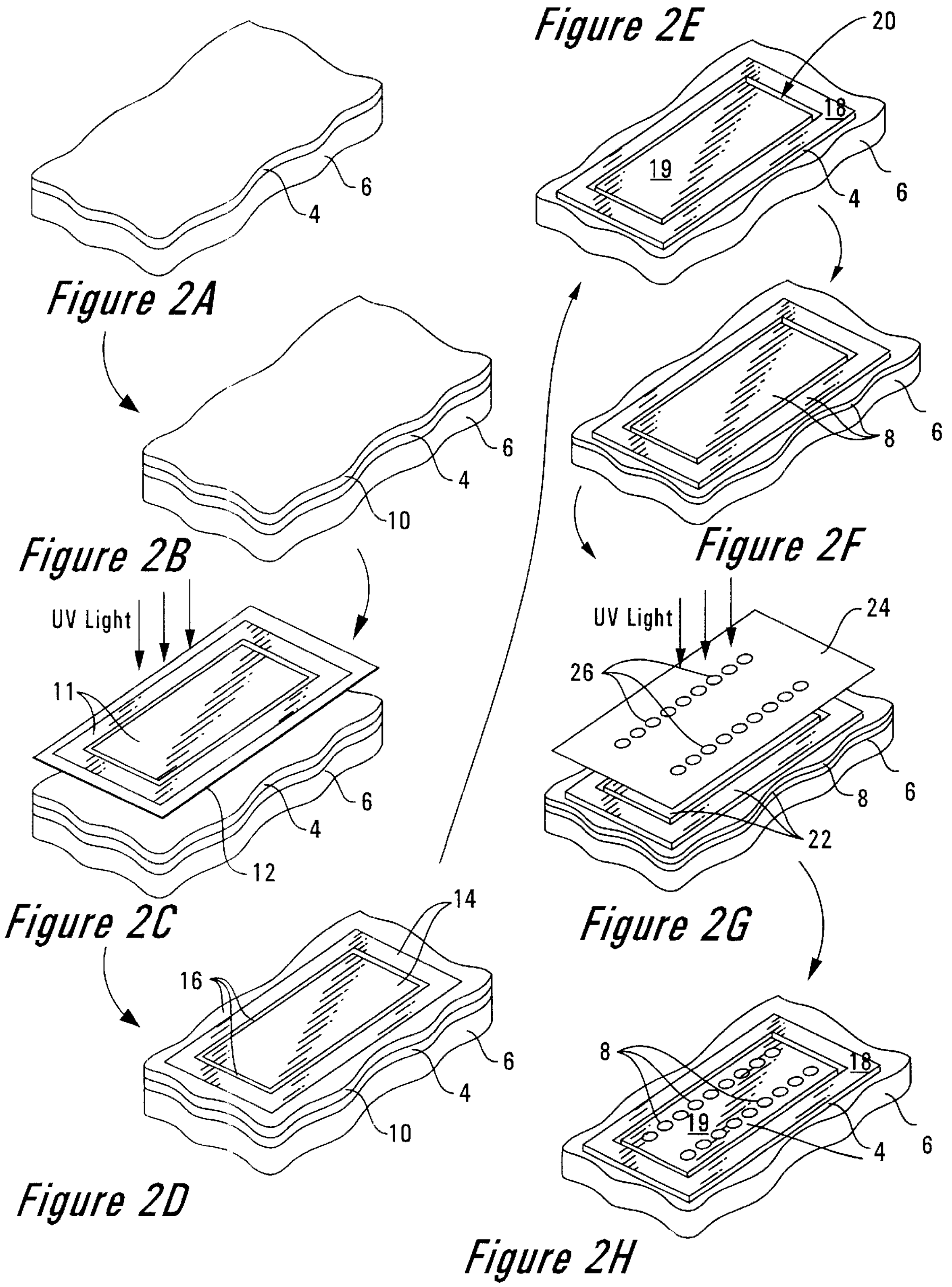
FIGS. 2A–2H are isometric views of the mandrel in FIG. 1A in different stages of a process for making the mandrel.

The process starts with using a vacuum deposition process, such as the planar magnetron process to deposit a metallic layer or conductive thin film 4 on a substrate 6 of any smooth and non-conducting surface. This conductive thin film 4 is preferably of chrome and stainless steel. FIG. 2A shows the conductive thin film 4 on the substrate 6.

Next, a spinning process is used to deposit a photoresist layer 10 on top of the conductive thin film 4 as shown in FIG. 2B. This photoresist layer 10 is either positive or negative depending on the image or pattern 11 on a photomask 12 (FIG. 2C). The photomask 12 is next placed on the photoresist layer 10. The combination of the photomask 12 and photoresist layer 10 is then exposed to ultra-violet (UV) light as shown in FIG. 2C. After exposure to UV light, the photomask 12 is removed and the photoresist layer 10 is developed so that it bears the pattern 11. The pattern 11 defines masked regions 14 and unmasked regions 16 of the conductive thin film 4 as shown in FIG. 2D. Next, an etching process such as sputter-etching or chemical etching is used to completely etch the unmasked thin film regions 16. FIG. 2E shows the resultant conductive thin film 4 after etching. The etching defines a first molding surface 18, a second molding surface 19 and a gap 20 therebetween. The first and second molding surfaces 18, 19 are for forming thicker portions and an orifice area of an orifice plate respectively. For example, the thicker portions can be portions on the orifice plate forming a border around the orifice area. For such configuration, the first molding surface 18 preferably completely surrounds the second molding surface 19. The two molding surfaces 18, 19 are electrically isolated. Strips (not shown) of conductive thin film 4 link the first molding surfaces 18 so that they are all electrically connected.

Next, a plasma enhanced chemical vapor deposition process is used to deposit a dielectric layer 8 of silicon nitride on the etched conductive thin film 4 and substrate 6, as shown in FIG. 2F. The molding surfaces 18, 19 are not visible in FIG. 2F as the dielectric layer 8 covers them. Other non-conductive materials can also be used for this layer 8. Next, a second photoresist layer 22 is applied on the dielectric layer 8. Again, depending on the photomask image, either positive or negative photoresist is used. After the photoresist layer 22 is applied, a second photomask 24 having button patterns 26 is placed over the photoresist layer 22. The combination of the second photomask 24 and the photoresist layer 22 is exposed to UV light as shown in FIG. 2G. After an appropriate period of exposure, the photomask 24 is removed and the photoresist layer is developed to leave masked and unmasked regions (not shown) on the dielectric layer 8 beneath it. An etching process, such as plasma etching, is used to remove the unmasked regions of the dielectric layer 8. After the etching process the remaining photoresist layer is removed to leave dielectric buttons 8 on the conductive thin film 4 as shown in FIG. 2H. These dielectric buttons 8 form molding surfaces for electroforming orifices in the orifice area of an orifice plate. These dielectric buttons 8 can be arranged in any suitable manner but is commonly arranged in two rows. When arranged in this manner, the first molding surface may include a surface (not shown) that runs between the two rows of the dielectric buttons. The mandrel is then ready for use in electroforming an orifice plate.

Figure 3A:
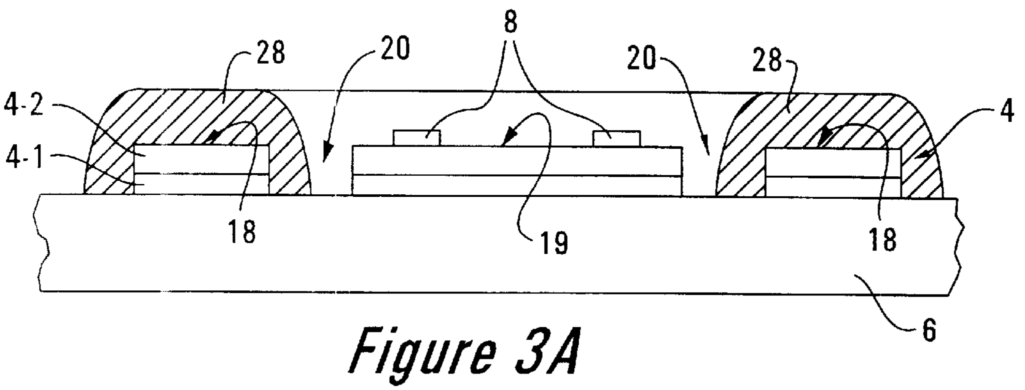
FIGS. 3A–3D are cross-sectional views similar to that in FIG. 1A showing stages of electroforming an orifice plate using the mandrel.

When used to electroform an orifice plate, the mandrel 2 is inserted into an electroforming bath as a cathode. A metal source material 28 which supplies the electroforming material is made an anode. The source material plate is preferably composed of a non-ink-corrosive metal such as a nickel alloy. During the electroforming process, current is initially allowed to flow through the conductive thin film regions that define the first molding surfaces 18 of the mandrel. Since the conductive thin film regions defining the second molding surfaces 19 are electrically isolated from the first molding surface regions 18, little or no current passes through the second molding surface regions 19 of the conductive thin film 4. The metal 28 is transferred from the anode metal plate onto the first molding surfaces 18 as shown in FIG. 3A. Since the electroforming bath is also a conductor, there will be leakage currents flowing through the second molding surface regions 19 of the conductive thin film 4. Such leakage currents will also cause metal to be deposited on the second molding surface 19. However, the buildup of metal on this surface 19 (not shown in FIG. 3A) is substantially slower than that on the first molding surface 18.

Figure 3B:
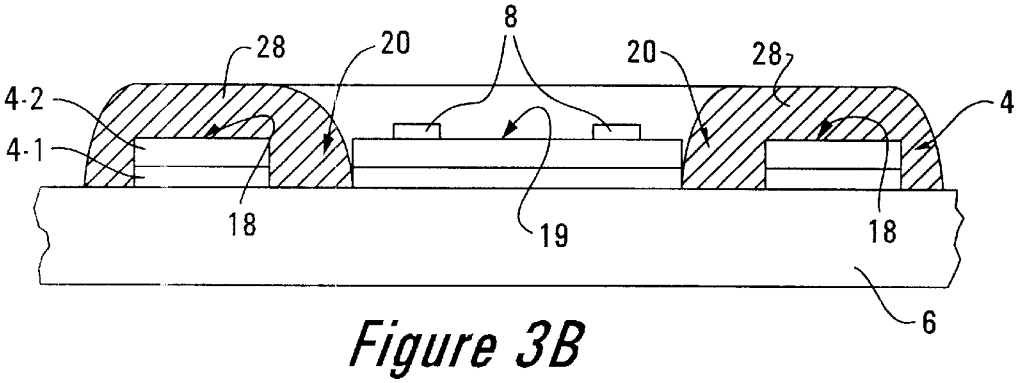
Figure 3C:
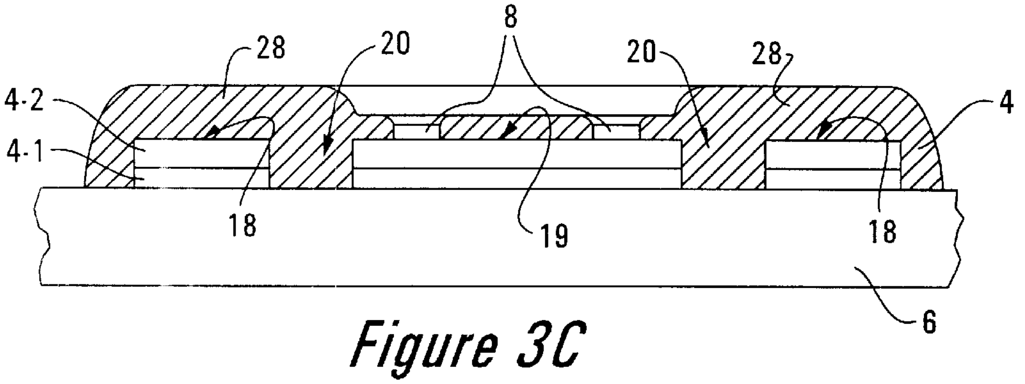
Figure 3D:
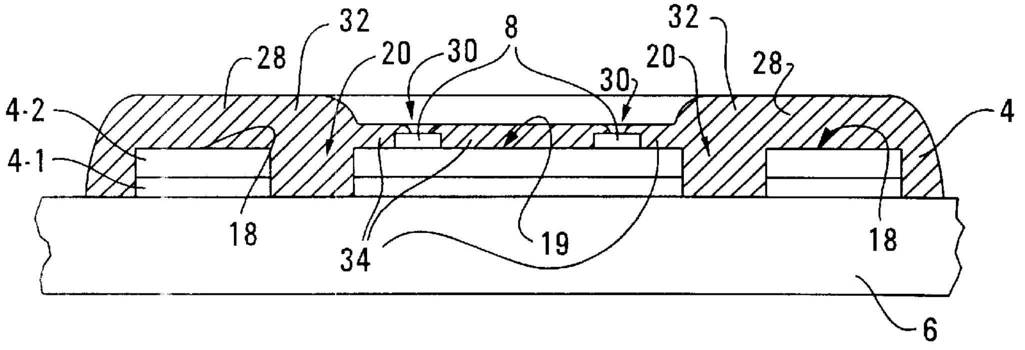

Over time the buildup of metal 28 around the first molding surface 18 bridges the gap 20 between the two molding surfaces 18,19 as shown in FIG. 3B. The two molding surfaces 18, 19 are electrically connected. From this point on, metal 28 will also start to substantially collect on the second molding surface 19 in addition to collecting on the first molding surface 18. Such deposition of metal is shown in FIG. 3C. As substantial deposition of metal occurs later on the second molding surface 19, less metal is deposited on this surface 19. As the electroforming process continues, metal will be deposited around the dielectric buttons 8 to form the orifices 30. The electroforming process is continued until a desired thickness of metal is deposited on the molding surfaces 18,19 and dielectric buttons 8. The electroforming of the orifice plate is then completed as shown in FIG. 3D.

The orifice plate is stripped from the mandrel 2 and preferably gold plated before it is ready for attachment to a printhead die. The orifice plate has a thicker border 32 and a thinner orifice area 34. With the ability to control the delay in electroforming the orifice area 34, the thickness of the orifice area 34 can be controlled with respect to the thickness of the border 32. With proper selection of the width of the gap 20, orifice plates that have borders 32 that are strong enough to withstand the rigors of manufacturing and orifice areas 34 that allow more orifices to be packed into a given area can be obtained. The general steps in the electroforming process just discussed are well known to those skilled in the art. The profile of accumulation of metal on the mandrel 2 is also well known.

There is a relationship between the width of the gap 20 and the relative thicknesses of the border 32 and orifice area 34. The wider the gap 20, the larger will be the difference in thicknesses of the border 32 and the orifice area 34. The table below shows some of the results obtained with different widths of the gap 20.

| Gap Width | Thickness of Border and Orifice Area (Microns) | |
|---|---|---|
| (Microns) | Plating Time, T1 | Plating Time, T2 (<T1) |
| 0 | 51.07 | 29.35 |
| 20 | 46.84 | 21.45 |
| 30 | 41.25 | 16.66 |
| 40 | 38.10 | 11.90 |

The row with gap width equals zero ($1^{st}$ row of table) indicates that there is no gap 20 between the molding surfaces 18, 19. Electroforming an orifice plate using such a mandrel will result in a substantially uniformly thick orifice plate of thicknesses of 51.07 and 29.35 microns for electroplating times of T1 and T2 respectively. There is no distinction between the border and orifice area of an orifice plate thus formed.

For a mandrel with a gap width of 30 microns ($3^{rd}$ row of table) used in an electroforming process for a time T1, the border 32 of an electroformed orifice plate will have a thickness of 51.07 microns and the orifice area 34 will have a thickness of 41.25 microns. From the results obtained, it can be seen that as the gap is widened, the difference in thicknesses of the border 32 and the orifice area 34 increases. A border thickness in a range of 30 to 50 microns is suitable for withstanding the rigors of manufacturing. The thickness of the orifice area 34 is preferably in a range of 10–20 microns. Other ranges of thicknesses are possible for the border 32 and the orifice area 34.

Figure 4:
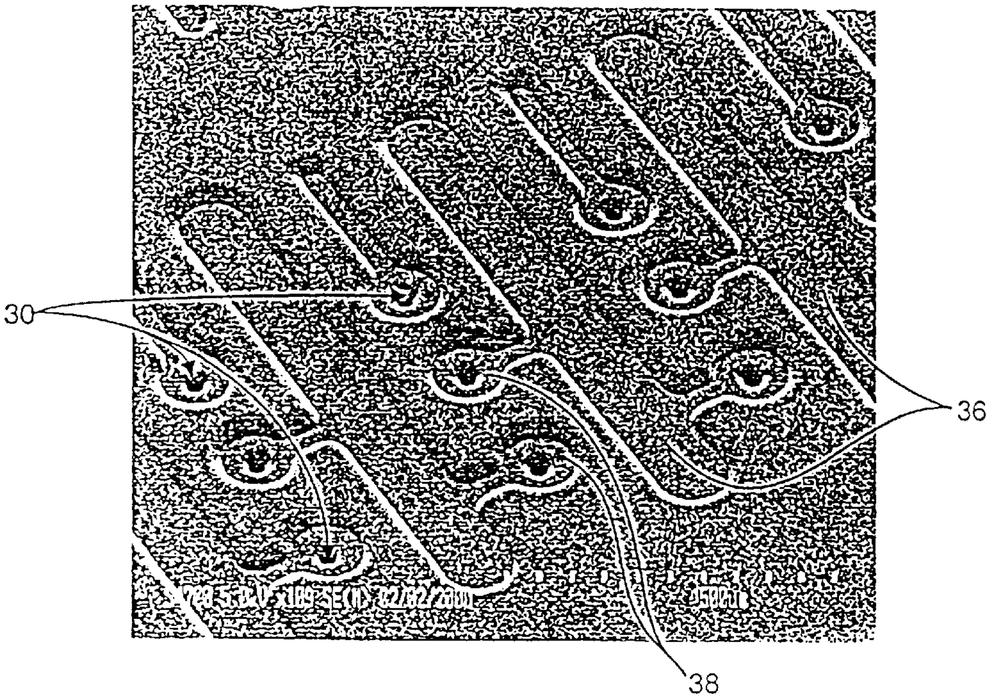
FIG. 4 is an isometric view of a portion of an orifice plate electroformed using a mandrel according to an alternative embodiment.

The invention should not be construed to be limited to the embodiment discussed above. A person skilled in the art would readily know that other configurations of the orifice plates could be electroformed using a mandrel with electrically isolated molding surfaces. For example, the metallic layer 4 may be appropriately lithographically patterned for electroforming walls that define ink channels 36 and ink chambers 38 on an orifice plate as shown in FIG. 4.

Figure 5:
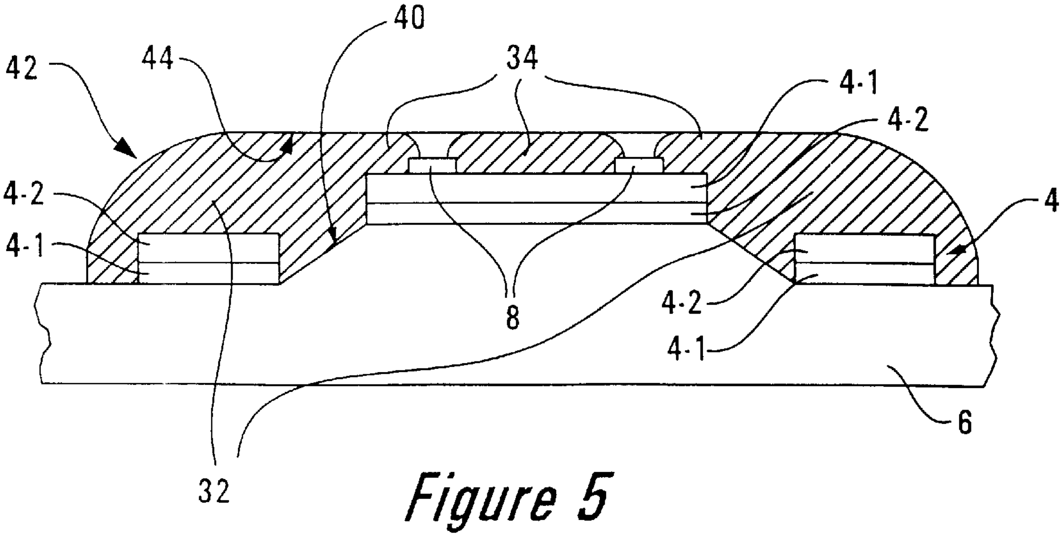
FIG. 5 is a cross-sectional view of a mandrel according to yet another embodiment of the present invention.

Such a person would also know that other processes could be used to produce different configurations of the mandrel. FIG. 5 shows a mandrel according to another embodiment for making orifice plates of non-uniform thicknesses. Instead of etching a gap 20, a step 40 is introduced on a substrate 6 to electrically isolate mandrel regions for forming the border 32 and orifice area 34. This step 40 can be etched in a polished silicon wafer substrate or created on a glass substrate by adding a layer of thick photoresist. FIG. 5 also shows a non-uniformly thick orifice plate 42 electroformed on such a mandrel. The orifice plate 42 that is formed has a substantially flat surface 44 that allows easier attachment to a barrier layer (not shown) of a printhead die.

Figure 6:
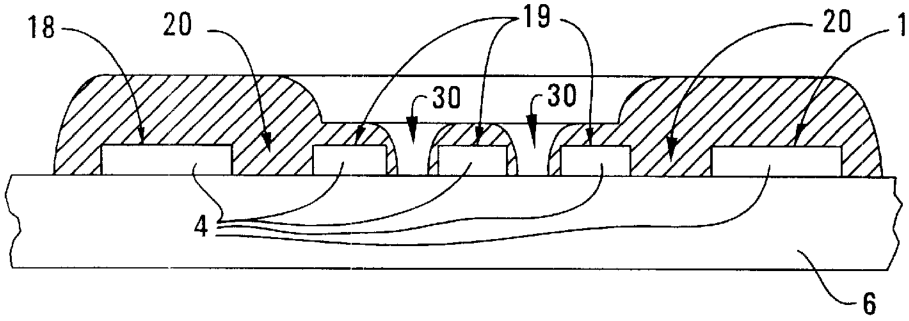
FIG. 6 is a cross-sectional view of a mandrel according to an embodiment that does not require a dielectric layer.
Figure 7A:
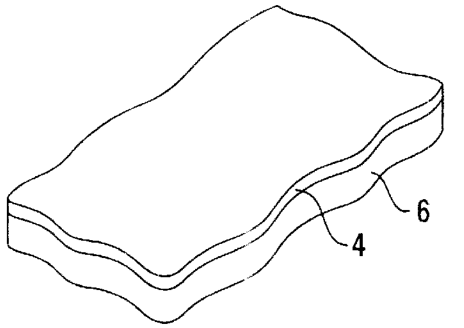
FIGS. 7A–7E are isometric views of the mandrel in FIG. 6 in different stages of a process for making the mandrel.
Figure 7B:
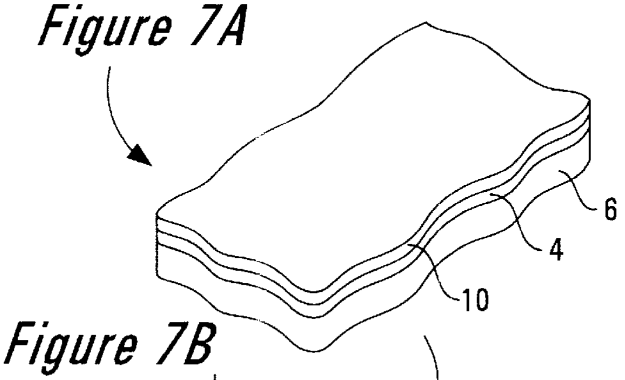
Figure 7C:
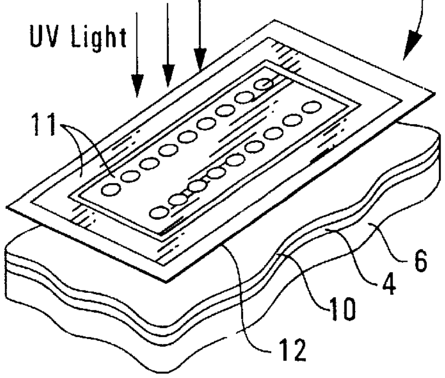
Figure 7D:
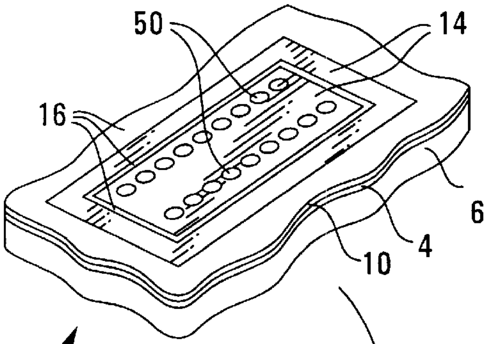
Figure 7E:
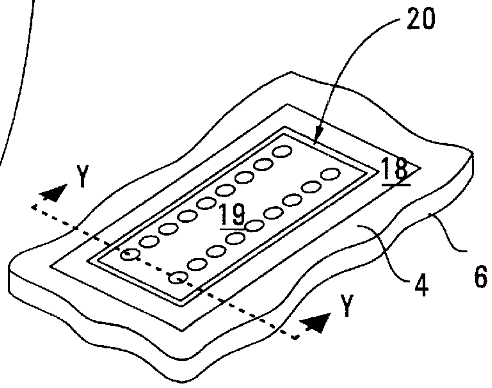

FIG. 6 is an enlarged cross-sectional view of a mandrel according to yet another embodiment of the present invention. This mandrel has a metallic layer 4 preferably of only chrome. This chromium layer 4 has a first molding surface 18 electrically isolated from a second molding surface 19 just like those discussed above. In this mandrel, the dielectric layer is not included. Orifices are electroformed in holes etched through the second molding surface 19.

FIGS. 7A–7E show the various stages of making the mandrel in FIG. 6. These stages are similar to those shown in FIGS. 2A–2E. The only difference is in the pattern 11 on the photomask 12. The pattern 11 used here further defines unmasked circles 50 on the metallic layer 4. The metallic layer 4 under these unmasked circles are etched away to define the holes in the seconding molding surface 19.

With the ability to electroform non-uniformly thick orifice plates, it is also possible to electroform orifice plates for a pen containing multi-colored inks. By adjusting the gaps between molding surfaces of an appropriate mandrel, different sections of the orifice plate can be electroformed to give different sizes and therefore resolutions of orifices.

I claim:

1. An electroformed orifice plate comprising:

an orifice area having orifices therethrough;

a first portion on the orifice plate that is thicker than the orifice area; and a second portion that connects the first portion and the orifice area, the second portion tapering from the first portion towards the orifice area to touch the orifice area.

2. An electroformed orifice plate according to claim 1, wherein the orifice area has an orifice-inlet side and an orifice-outlet side and wherein each orifice has an inlet at the orifice-inlet side that tapers towards a narrower outlet at the orifice-outlet side.

3. An electroformed orifice plate according to claim 2, wherein the tapered second portion is connected to the orifice-outlet side of the orifice area.

4. An electroformed orifice plate according to claim 3, wherein a surface of the thicker first portion is planar with the orifice-inlet side of the orifice area.

5. An electroformed orifice plate according to claim 2, wherein the tapered second portion includes a tapered second portion having a rounded profile.

6. An electroformed orifice plate according to claim 5, wherein the tapered second portion is connected to the orifice-inlet side of the orifice area.

7. An electroformed orifice plate according to claim 5, wherein the rounded profile is a result of unimpeded electroforming of metal over an edge of a molding surface on a mandrel.

8. An electroformed orifice plate comprising:

an orifice area having orifices therethrough;

a first portion on the orifice plate that is thicker than the orifice area; and a second portion that connects to the first portion and that tapers from the first portion towards the orifice area;

wherein the first portion, the second portion and the orifice area are electroformed in a single electroforming step without requiring any step to prevent buildup of electroforming material on the orifice area when the thicker first portion is electroformed.

* * * * *

UNITED STATES PATENT AND TRADEMARK OFFICE
CERTIFICATE OF CORRECTION

PATENT NO. : 6,586,112 B1
DATED : July 1, 2003
INVENTOR(S) : Bun Chay Te

It is certified that error appears in the above-identified patent and that said Letters Patent is hereby corrected as shown below:

Column 6,
Line 22, insert
--

1. A mandrel for electroforming printhead orifice plates, comprising:

a non-conductive flat planar substrate plate;

a border planar structure of conductive film deposited on the substrate plate and defining a thick-walled perimeter for an electroformed orifice plate for attachment to a printhead die;

an inner planar structure of conductive film deposited on the substrate plate and bounded by the border structure, and defining a thin-wall orifice portion of said electroformed orifice plate;

a uniform, surrounding, and electrically isolating gap disposed between the border structure and the inner structure and having a minimum gap width on which the relative thicknesses of said border and said thin-wall orifice portion of said electroformed orifice plate depend; and a plurality of dielectric buttons disposed on top of the inner planar structure and providing for orifice holes in said thin-wall orifice portion of said electroformed orifice plate.

UNITED STATES PATENT AND TRADEMARK OFFICE

CERTIFICATE OF CORRECTION

PATENT NO. : 6,586,112 B1
DATED : July 1, 2003
INVENTOR(S) : Bun Chay Te

It is certified that error appears in the above-identified patent and that said Letters Patent is hereby corrected as shown below:

2. A method for electroforming an orifice plate, comprising:

starting an electroforming bath with a mandrel that has:

a non-conductive flat planar substrate plate;

a border planar structure of conductive film deposited on the substrate plate and defining a thick-walled perimeter for an electroformed orifice plate for attachment to a printhead die;

an inner planar structure of conductive film deposited on the substrate plate and bounded by the border structure, and defining a thin-wall orifice portion of said electroformed orifice plate;

a uniform, surrounding, and electrically isolating gap disposed between the border structure and the inner structure and having a minimum gap width on which the relative thicknesses of said border and said thin-wall orifice portion of said electroformed orifice plate depend; and a plurality of dielectric buttons disposed on top of the inner planar structure and providing for orifice holes in said thin-wall orifice portion of said electroformed orifice plate beginning an electroforming of said electroformed orifice plate by connecting said border planar structure of conductive film as an electrode and leaving said inner planar structure of conductive film unconnected;

allowing said electroforming to continue past the point where metal deposits and bridges across said gap and electrically connects said inner planar structure of conductive film to said electrode;

stopping said electroforming when said thick-walled perimeter and said thin-wall orifice portion of said electroformed orifice plate have attained a target thickness; and stripping said electroformed orifice plate off said mandrel.

---

Signed and Sealed this

First Day of June, 2004

Jon W. Dudas

JON W. DUDAS
*Acting Director of the United States Patent and Trademark Office*